United States Patent [19]

Grube et al.

[11] Patent Number: 5,507,009
[45] Date of Patent: *Apr. 9, 1996

[54] METHOD FOR REPROGRAMMING A COMMUNICATION UNIT'S ACCESS TO A WIRELESS COMMUNICATION SYSTEM

[75] Inventors: Gary W. Grube, Palatine; Timothy W. Markison, Hoffman Estates; Thomas E. Weston, Marengo, all of Ill.

[73] Assignee: Motorola, Inc., Schaumburg, Ill.

[*] Notice: The term of this patent shall not extend beyond the expiration date of Pat. No. 5,379,343.

[21] Appl. No.: 155,026

[22] Filed: Nov. 19, 1994

Related U.S. Application Data

[63] Continuation-in-part of Ser. No. 106,020, Aug. 13, 1993, abandoned.

[51] Int. Cl.⁶ .................. H04B 1/00; H04B 7/00
[52] U.S. Cl. .............. 455/54.1; 455/54.2; 455/56.1
[58] Field of Search .................. 455/38.1, 53.1, 455/54.1, 54.2, 56.1, 186.1; 340/825.44, 311.1; 379/62, 63, 58

[56] References Cited

U.S. PATENT DOCUMENTS

| | | | |
|---|---|---|---|
| 4,928,098 | 5/1990 | Dannhaeuser | 340/825.56 |
| 5,012,234 | 4/1991 | Dulaney et al. | 455/186.1 |
| 5,239,294 | 8/1993 | Flanders et al. | 379/63 |
| 5,301,232 | 4/1994 | Mulford | 380/21 |
| 5,337,345 | 8/1994 | Cassidy et al. | 379/62 |
| 5,379,343 | 1/1995 | Grube et al. | 380/4 |
| 5,388,212 | 2/1995 | Grube et al. | 379/62 |

*Primary Examiner*—Reinhard J. Eisenzopf
*Assistant Examiner*—Marsha D. Banks-Harold
*Attorney, Agent, or Firm*—Timothy W. Markison

[57] ABSTRACT

A monitoring computer (115) monitors a communication resource within a wireless communication system for transmissions by a communication unit. Upon detecting the transmission, which contains a unit identifier, the monitoring computer compares the unit identifier with stored system access information for the communication unit. When the unit identifier is not compatible with the stored system access information, the monitoring computer reprograms at least a portion of the system access information of the communication unit. In this manner, discrepancies in communication unit programming may be corrected.

12 Claims, 3 Drawing Sheets

| 201 DEVICE ID CODE | 202 FEATURES | 203 APPL. TYPE ID'S | 204 APPLICATION SERIAL NUMBERS | 205 LOCATION AND TIME AND COUNT | 206 GROUP ID CODE | 212 HARD ID |
|---|---|---|---|---|---|---|
| 1 | 3,5,7 | 25 | 10-3763 | 22/18:10/3 | 201 | 173 |
| 2 | 1,3,8 | 12 | 9-4509756 | 15/18:20/5 | 201 | 218 |
| 3 | 3,4,5 | 106 | 49-46383 | 6/14:00/2 | 300 | 156 |

| 207 GROUP ID CODE | 208 FEATURES | 209 APPL. TYPE ID'S | 210 APPLICATION SERIAL NUMBERS | 211 COPIES |
|---|---|---|---|---|
| 201 | 1,3,5,7,8 | 25 | 10-3763 | 1 |
|  |  | 12 | 9-4509756 | 1 |
| 202 | 11 | 79 | 30-29463 | 2 |
|  |  |  | 30-29464 |  |
| 300 | 3,4,5,10 | 106 | 49-46383 | 10 |

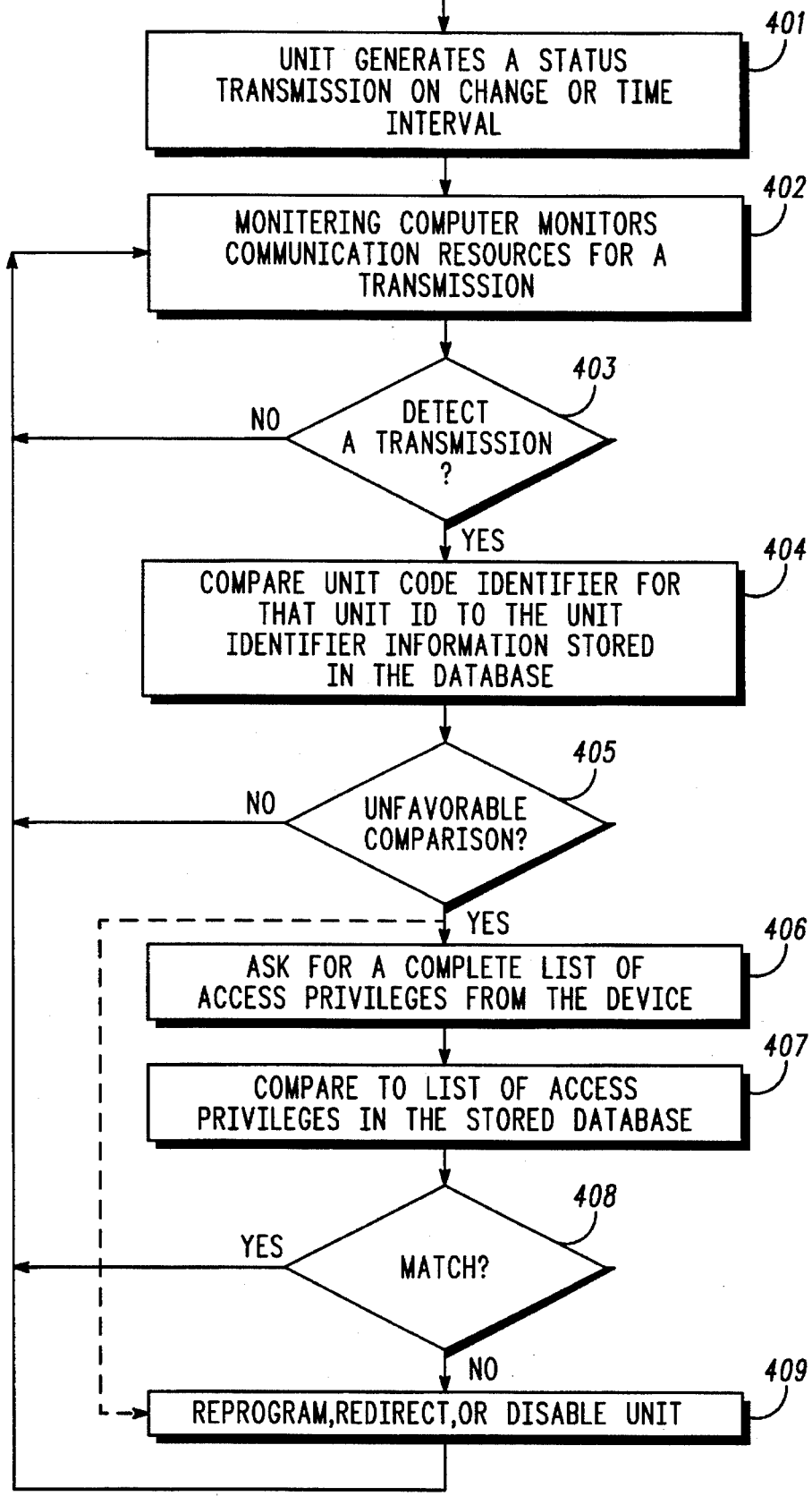

# METHOD FOR REPROGRAMMING A COMMUNICATION UNIT'S ACCESS TO A WIRELESS COMMUNICATION SYSTEM

This patent application is a continuation in part of application having a serial number of Ser. No. 08/106,020, filing date of Aug. 13, 1993, entitled A Method For Detecting Unauthorized Modification Of A Communication Or Broadcast Unit is now abandoned.

FIELD OF THE INVENTION

The present invention relates generally to communication systems and, in particular, to a method for reprogramming a communication unit's access privileges to a wireless communication system.

BACKGROUND OF THE INVENTION

The basic operation and structure of land mobile radio communication systems and cellular radio/telephone communication systems (communication systems) are known. Communication systems typically comprise a plurality of communication units (vehicle mounted or portable radios in a land mobile system and radio/telephones in a cellular system), a predetermined number of repeaters that transceive information via communication channels, and a controlling entity. The controlling entity may either be a centralized call processing controller or a network of distributed controllers working together to establish communication paths for the communication units.

During normal operations, communication units often utilize various communication services or features to communicate with one another. To access these services, the unit transmits a unique ID and a service request to the controller. Upon receiving the request, the controller verifies that the unique ID is valid and that this unit is allowed to access the service requested. If both inquiries are answered favorably, the unit is granted access to the service such that it may communicate with other units. A few of the services that a communication unit may access include a group dispatch call, a private call, a secure voice feature, and telephone interconnect.

What service a communication unit can access is determined by the customer when the unit is purchased. For example, if the customer wants a regular unit (one that provides only group dispatch calls), the manufacturer programs the unit with system access information that only allows the unit to participate in group dispatch calls. If, on the other hand, the customer wants an enhanced unit (one that provides group dispatch and at least one other service), the manufacturer programs the unit with system access information that allows the unit to access the services selected. The manufacturer can program regular and enhanced units in a variety of ways. For example, regular and enhanced communication units may contain a complete set of software applications where code plugs are used to enable the appropriate software applications. As another example, an external programming device may be used to load or enable the appropriate software applications in to the units. For instance, many communication products made by Motorola utilize Radio Service Software (RSS) to enable the appropriate software.

As would be expected, the more services a unit can access, the more costly the unit. Thus, when a regular unit is upgraded to an enhanced unit by illicit means, the manufacturer is injured. Manufacturers do attempt to limit the injury by utilizing the programming methods described above (code plugs and RSS) but, unfortunately, these techniques can be overcome by less than scrupulous communication unit users. For example, the less than scrupulous user may copy the non-volatile memory of an enhanced communication unit and place it in a regular unit or, via reverse engineered external programming equipment, reprogram regular units with additional services. As another example, the less than scrupulous user may take parts of damaged or scrapped units, tear them apart, and reconstruct an enhanced unit.

To further limit the potential for injury, manufacturers construct their communication systems to include means that deny improperly programmed communication units access to the system. To implement this, the system contains a data base of system access information for each unit, where the system access information includes unit identifiers and indications of the services each unit may access. Unfortunately, the communication system cannot determine whether a communication unit received its valid system access information through proper means or through illicit means. Thus, units with valid, but illicitly obtained, system access information are treated the same as authorized units, which can overburden the system. Therefore a need exists for a method that detects when a communication unit has a valid, but illicitly obtained, system access information and corrects the system access information when such an occurrence is detected.

BRIEF DESCRIPTION OF THE DRAWINGS

FIG. 4 illustrates a logic diagram that may be used to implement the present invention.

DESCRIPTION OF A PREFERRED EMBODIMENT

Generally, the present invention provides a method for reprogramming communication units that have valid, but illicitly obtained, system access information. This is accomplished by associating a monitoring computer with the communication system to monitor communication resources within the communication system. While monitoring communication resources, the monitoring computer receives unit identifiers from transmitting communication units, wherein the unit identifiers include unique coding that identifies the communication unit and its platform (software and hardware configuration). Upon receiving a unit identifier, the monitoring computer compares the received unit identifier with a stored unit identifier for the particular communication unit. When the received and stored unit identifier do not correspond, the monitoring computer transmits a command to reprogram the communication unit. With such a method, communication units that have valid, but illicitly obtained, system access information can be readily reprogrammed, thus freeing up valuable communication resources for authorized users.

Figure 1:
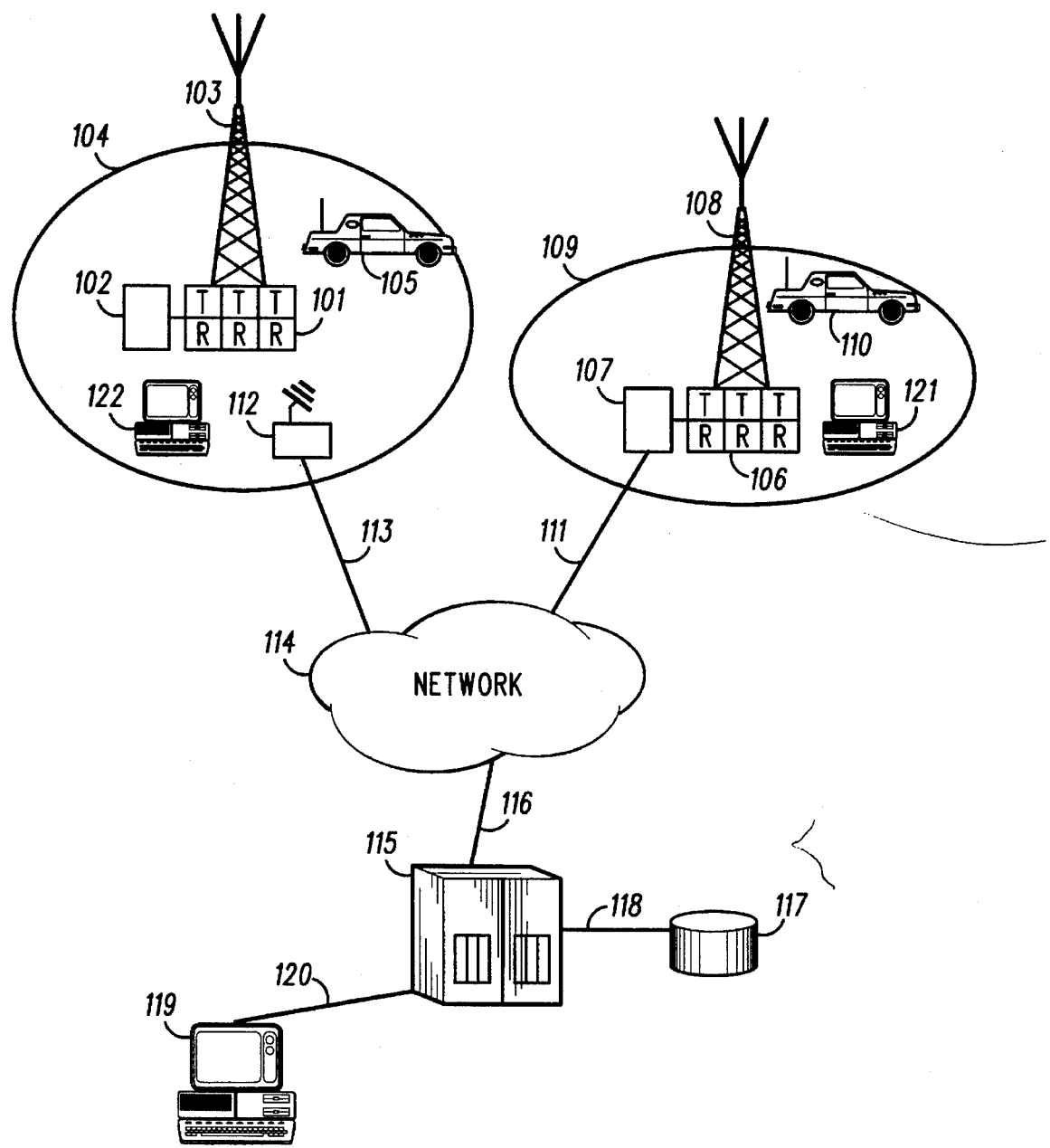
FIG. 1 illustrates a multi-site communication system, equipped with a monitoring computer, in accordance with the present invention.

The present invention can be more fully described with reference to FIGS. 1–4. FIG. 1 illustrates multiple communication systems (104, 109) operably connected to a monitoring computer (115). Each communication system (104, 109) comprises a plurality of communication units (105, 110), a predetermined number of broadcast units or base stations (101, 106) operably connected to fixed antenna systems (103, 108), and a call processing controller (102, 107). The call processing controller (102, 107), which may be a Motorola Smartzone™ Zone Controller, transmits and receives via the base stations (101, 106) control information to establish communications between two or more communication units.

The monitoring computer (115), connected to a database (117) and a computer terminal (119), is operably coupled to the communication systems (104, 109) via a network (114). The monitoring computer (115), database (117), and computer terminal (119) may comprise a commercially available mid-range computing device, such as an IBM AS400. As shown, there are at least two ways to couple the monitoring computer (115) to the communication systems (104, 109). First, a communication system (104) may be connected to the network (114) by way of an over-the-air radio modem (112), which in turn communicates with the call processing controller (102) over at least one channel in the group of base stations (101). Alternatively, the network (114) connection can be established directly to the call processing controller (107).

In either case, the coupling allows the monitoring computer (115) to monitor communications in the communication systems (104,109) and to access communication resources when needed to reprogram a communication unit (discussed below). The manner in which the monitoring computer (115) is coupled to the network (114) as well as the manner in which control information is routed to the monitoring computer (115) is dependent upon the actual computing device used to implement the monitoring computer (115) and the network protocol. For example, if the network (114) is a public switched telephone network (PSTN), the monitoring computer (115) would need a modem as would the call processing controller (107).

Figures 2A, 2B, 3:
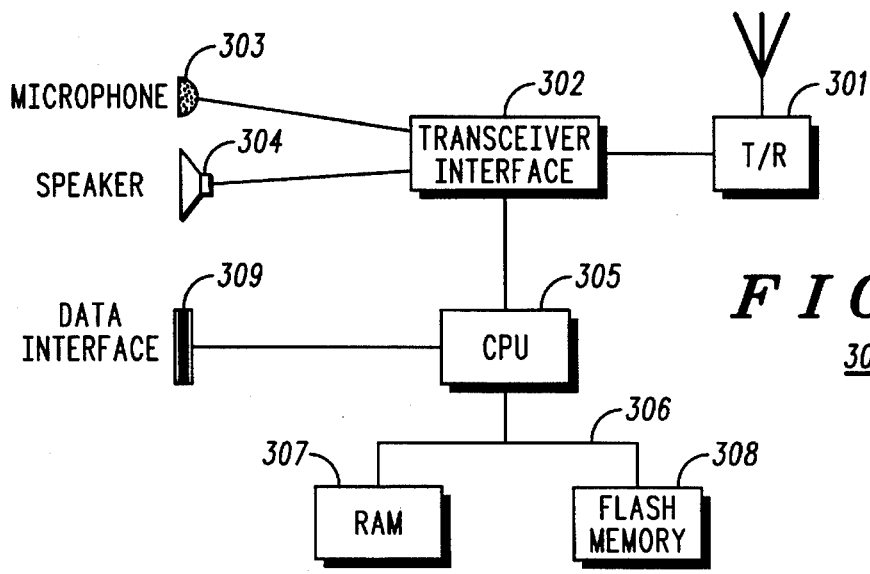
FIGS. 2A–2B illustrate a database format which may be used by the monitoring computer in accordance with the present invention.
FIG. 3 illustrates a block diagram of a communication unit in accordance with the present invention.

FIGS. 2A–2B illustrate tables of the database (117) that contain, for each communication unit being monitored, stored system access information. In the first table (200) of FIG. 2A, a unit ID code field (201) contains the unique IDs of the communication units. For each communication unit in the data base there is information relating to features (202), software application types (203), software application serial numbers (204), location, time and count of transmissions (205), group affiliation (206), and hardware serial numbers (212). The features field (202) lists the services or features this unit is allowed to request and use, i.e., these are the features/services that the customer has purchased. The application type field (203) lists the type of software applications needed to perform the features listed in the feature field (202). The software application serial number field (204) lists the specific serial numbers of the software programmed in to the unit. The location, time, and count field (205) stores the location and times when the unit transmits. This field only stores this information for a predetermined period of time, for example, a day. The group ID code field (206) is used to correlate a unit with a group listed in table 2 (213). Finally, the hardware field (212) lists the IDs of circuit boards, modules, and chassis that make up the unit. Note that the hardware ID is typically comprised of a combination of the individual IDs of the circuit boards, modules, and the chassis.

From the system access information listed in table 1 (200), a unit identifier is comprised. For example, the software application serial numbers, the hardware ID, and the features may be combined to form the unit identifier. Thus, for the communication unit having device code ID 1, the unit identifier could be 357-10-3763-173, which is a serial combination of the information contained in the table. From this brief example, it is apparent that countless unit identifiers may be created via mathematical manipulations of the system access information. In addition, the unit identifier could include a status change message to indicate that the system access information of the communication unit has been changed. The status change message may be a simple one-bit indicator ("1" for a change "0" for no change), or a complexed word that indicates the portion of the communication unit that has been changed.

The second table (213) of FIG. 2B contains, for each communication unit of a group being monitored, stored system access information for members of a particular communication group. For each group, the stored information pertains to the group ID (207), features (208), software application types (209), software application serial numbers (210), and the number of copies of each software application (211). The feature field (208), the application type field (209) and the serial number field (210) are identical to the similarly named fields of table 1 (200), thus no further discussion of these fields will be presented.

FIG. 3 illustrates a block diagram of a communication unit (300) that includes a transceiver (301) operably coupled to the remainder of the communication unit (300) via a transceiver interface (302). The remainder of the communication unit (300) includes a microphone (303), a speaker (304), a central processing unit (CPU) (305), volatile memory (307), programmable non-volatile memory (308), and a data interface (309). Note that the transceiver (301) transmits and receives information using communication resources such as TDM (time-division multiplexed) slots, carder frequencies, a pair of carrier frequencies or any other radio frequency (RF) transmission media.

The microphone (303) and speaker (304) provide an input and an output, respectively, for routine voice communications of the unit users. The CPU (305), which may comprise a Motorola 68HC11 microprocessor, provides control of the communication unit (300) and also provides direct communication to other external computing devices by way of the data interface (309), which may be an EIA standard port such as RS-232, RS- 422, or another type. The volatile memory (307) may be random-access memory (RAM) whereas the programmable non-volatile memory (308) can be a flash memory such as EEPROM. In a preferred embodiment, software applications used by the communication unit (300) are stored in the programmable non-volatile memory (308).

In operation, a user of the communication unit (300) may request a particular system service by initiating the appropriate function on the communication unit (300) (for example, a push to talk function that prepares a request for a channel access message). Once initiated, the communication unit (300) transmits, via a control channel, the request and a unit identifier to a call processing controller (102, 107). If the unit identifier is valid and the requested service is one that the unit may access, the call processor grants the unit access to the service. Recall that the call processor does not inquire whether the unit received the unit identifier through illicit means. With the inclusion of the monitoring computer (115) of the present invention, the system can detect whether the unit received the unit identifier through illicit means as described with reference to FIG. 4.

FIG. 4 illustrates a logic diagram that the monitoring computer (115) may incorporate to detect the illicit incorporation of unit identifiers in communication units or in broadcast unit. At step 401, a unit (communication or broadcast) generates a status transmission upon detection of a change in the unit or upon expiration of a predetermined period of time (for example, a week). If the status message is generated upon detection of a change in the unit, the unit must be equipped with tamper detection circuitry. The tamper detection circuitry detects when the unit is being physically tampered with, i.e., the housing being opened, and detects when the unit is being electrically tampered with, i.e., being reprogrammed. Regardless of the generation trigger, the status transmission is the unit identifier of the unit that was described above with reference to FIGS. 2A–2B. Recall that the unit identifier may be a mathematical manipulation of the information listed in the table, thus the monitoring computer needs to be programmed with the particular mathematical manipulation used, such that it can recapture the system access information.

While the status transmission is only generated upon a change or expiration of a predetermined period of time, the monitoring computer continually monitors for such transmissions (402). When the monitoring computer detects a transmission (403), it compares the transmitted unit identifier with stored unit identifier information (404). The stored unit identifier information may be the unit identifier or the system access information that comprises the unit identifier. If the comparison is favorable (405) (i.e., the unit identifiers match or the stored system access information was properly computed from the reverse mathematical manipulation of the system access information in the unit), the process repeats at step (402).

If the comparison was unfavorable (405), the monitoring computer can either reprogram the unit or request further information from the unit. If the monitoring computer requests further information, the monitoring computer asks the unit for a complete list of the unit's system access information (406). This information is then compared with the stored system access information for the unit (407). If the information matches (408), the process repeats at step (402). If, however, the information does not match (408) or the monitoring computer reprograms the unit directly, the monitoring computer reprograms the unit (409). For example, the unit may be reprogrammed to overwrite at least a portion of its system access information with reprogramming information. The reprogramming information may be a correct list of system access privileges, instructions to disable the unit, a set of default services, instructions to re-affiliate the unit/group with a default communication group in the same system, or instructions to re-affiliate the unit/group with a default communication system. If the reprogramming information instructs the unit to disable, the unit may receive a message indicating that the unit has been removed from service.

The present invention provides a method for reprogramming communication units that have valid, but illicitly obtained, system access information. With such a method, communication units that obtained valid access privileges through illicit means can be detected and reprogrammed. Such units may be reprogrammed to have the system access privileges that are authorized for the unit, the unit may be disabled, or re-assigned to a default group or system. Prior art communication unit software and hardware protection methods do not address the problem of valid unit identifiers being placed in unauthorized communication units. Specifically, RSS limits service access to valid ID's and software applications, although, RSS does not determine how the communication units received the system access privileges.

We claim:

1. A method for correcting a communication unit's access to a wireless communication system, the method comprises the steps of;
 a) after expiration of a predetermined time period, transmitting, by the communication unit, a message that includes a unit configuration identifier;
 b) upon receiving the message, comparing, by a monitoring computer, the unit configuration identifier and stored unit identifier information; and
 c) when the comparison of step (b) is unfavorable, reprogramming, by the monitoring computer, at least a portion of system access information of the communication unit.

2. In the method of claim 1, wherein the unit configuration identifier includes a hardware code, the reprogramming step (c) further comprises a step of reprogramming the at least a portion of the system access information to prohibit the communication unit from future access to the wireless communication system.

3. In the method of claim 1, wherein the unit configuration identifier includes a software application code, the reprogramming step (c) further comprises a step of reprogramming the at least a portion of the system access information to correspond the system access information with stored system access information for the communication unit.

4. In the method of claim 1, wherein the unit configuration identifier includes a software application code, the reprogramming step (c) further comprises a step of reprogramming the at least a portion of the system access information with default system access information.

5. In the method of claim 1, wherein the unit configuration identifier includes a hardware code, the reprogramming step (c) further comprises a step of reprogramming the at least a portion of the system access information to affiliate the communication unit with a default communication group.

6. In the method of claim 1, wherein the unit configuration identifier includes a hardware code, the reprogramming step (c) further comprises a step of reprogramming the at least a portion of the system access information to affiliate the communication unit with a default communication system.

7. A method for correcting a broadcasting unit's operational platform, the method comprises the steps of;
 a. after expiration of a predetermined time period, transmitting, by the broadcast unit, a message that includes a unit configuration identifier;
 b. upon receiving the message, comparing, by a monitoring computer, the unit configuration identifier and stored unit identifier information; and
 c. when the comparison of step (b) is unfavorable, reprogramming, by the monitoring computer, at least a portion of operational platform information of the broadcast unit.

8. A method for correcting a communication unit's access to a wireless communication system, the method comprises the steps of;
 a. detecting a modification of the communication unit;
 b. upon detection of the modification, transmitting, by the communication unit, a message that includes a unit configuration identifier;
 c. upon receiving the message, comparing, by a monitoring computer, the unit configuration identifier and stored unit identifier information; and
 d. when the comparison of step (c) is unfavorable, reprogramming, by the monitoring computer, at least a portion of system access information of the communication unit.

9. The method of claim 8 further including prior to the transmitting step (b), upon detection of the modification, a step of generating a changed status message.

10. The method of claim 9, the transmitting step (b) further comprises a step of transmitting the changed status message as part of the message.

11. A method for correcting a broadcasting unit's operational platform, the method comprises the steps of;

a. detecting a modification of the broadcast unit;

b. upon detection of the modification, transmitting, by the broadcast unit, a message that includes a unit configuration identifier;

c. upon receiving the message, comparing, by a monitoring computer, the unit configuration identifier and stored unit identifier information; and d) when the comparison of step (c) is unfavorable, reprogramming, by the monitoring computer, at least a portion of operational platform information of the broadcast unit.

12. A method for correcting a communication unit's access to a wireless communication system, the method comprising the steps of:

a) detecting, by the communication unit, a modification;

b) after detection, transmitting, by the communication unit, a message that includes a unit configuration identifier;

c) upon receiving the message, comparing, by the monitoring computer, the unit configuration identifier to stored unit identifier information for the communication unit;

d) when the comparison of step (c) is unfavorable, transmitting, by the monitoring computer, a request for communication unit system access privileges to the communication unit;

e) upon receipt of the request, transmitting, by the communication unit, the communication unit system access privileges to the monitoring computer;

f) upon receipt of the communication unit system access privileges, comparing, by the monitoring computer, the communication unit system access privileges with stored system access information; and g) for each non-matching system access, reprogramming, by the monitoring computer, the communication unit system access privileges to substantially match system access privileges indicated by the stored system access information.

* * * * *